Feb. 28, 1956 G. C. ELLERBECK 2,736,497

AUXILIARY KEYBOARD MECHANISM ADAPTED FOR SQUARE ROOT OPERATIONS

Filed June 17, 1952 6 Sheets-Sheet 1

GRANT C. ELLERBECK
INVENTOR.

BY Robyn Wilcox

ATTORNEY

GRANT C. ELLERBECK
INVENTOR
BY [signature]
ATTORNEY

Feb. 28, 1956 G. C. ELLERBECK 2,736,497

AUXILIARY KEYBOARD MECHANISM ADAPTED FOR SQUARE ROOT OPERATIONS

Filed June 17, 1952 6 Sheets-Sheet 3

GRANT C. ELLERBECK
INVENTOR.

BY Robyn Wilcox

ATTORNEY

GRANT C. ELLERBECK
INVENTOR.
BY Robyn Wilcox
ATTORNEY

Feb. 28, 1956

G. C. ELLERBECK

AUXILIARY KEYBOARD MECHANISM ADAPTED FOR SQUARE ROOT OPERATIONS 2,736,497

Filed June 17, 1952

6 Sheets-Sheet 5

GRANT C. ELLERBECK
INVENTOR.

BY Robyn Wilcox

ATTORNEY

GRANT C. ELLERBECK
INVENTOR.
BY Rolyn Wilcox
ATTORNEY

United States Patent Office 2,736,497

Patented Feb. 28, 1956

2,736,497

AUXILIARY KEYBOARD MECHANISM ADAPTED FOR SQUARE ROOT OPERATIONS

Grant C. Ellerbeck, San Leandro, Calif., assignor to Friden Calculating Machine Co., Inc., a corporation of California Application June 17, 1952, Serial No. 293,973

6 Claims. (Cl. 235—146)

This invention relates to calculating machines and particularly to one which, in addition to performing the usual four calculations of addition, subtraction, multiplication and division, is particularly adapted to simplify the manual extraction of the square root of a radicand factor contained in the accumulator register in a rapid and accurate manner.

The primary object of this invention is to provide a calculating machine capable of extracting square root of any given number manually, with mechanisms which simplify the operation and reduce the possibility of error by the operator.

Another object of the present invention is to provide a bank of value setting keys of the same value, with a laterally arranged latching mechanism, operative, on depression of any key of such bank, to release all of the other keys of such bank. It can be mentioned here that the term "bank" as applied to a full keyboard machine, as in the machine shown herein, is used to designate a transverse row of keys of like value, one in each decimal position of the keyboard (e. g., the horizontal row of "5" keys); while the term "order" is used to designate the keys of a particular decimal position, including the keys of the values of from "1" to "9" (e. g., the first, or lowest, order indicates the longitudinal or vertical, row of keys shown in the right-hand row of the keyboard shown in Fig. 1).

Square root can be extracted manually in a conventional calculating machine, such as the well-known "Friden Automatic Calculator." Heretofore, such extraction required a rather long and complicated process, which required considerable skill on the part of the operator and also strict attention to the work being done as the possibility of error was great. The complexity of the process is graphically illustrated in the chart which follows shortly. When using a calculating machine, the extraction of square root is performed by first putting the radicand into the register five times; secondly, in the order in which extraction would have been initiated in the radicand, subtract "5," then "15," "25," etc., to an overdraft; then correcting the overdraft; then shifting the carriage one order to the left; and, after erasing the "5" of the previous values, repeating the operation in the next lower order.

It is believed that the mechanism of my invention will be more readily understood if the method itself is first described in detail. The method utilized includes the following steps (being described as applied to the commercial Friden automatic calculating machine, such as described in U. S. Patent No. 2,229,889, issued to Carl M. Friden, January 28, 1941).

A. The machine is conditioned for extracting the square root by having the carriage at its extreme right-hand position, the counter-control mechanism set to actuate the counter in an unlike sign character with respect to the actuator (the counter counts positively during subtractive operations), the automatic keyboard clearing mechanism is disabled, and, in those machines so equipped, the machine is set for single cycle operation (without clearing the keyboard).

B. The next step is to set the radicand in the keyboard, preferably at the left side thereof, and enter it five times into the register, positively. The product, sometimes hereinafter referred to as the "radicand factor," will thus be registered at, or immediately adjacent, the left-hand end of the register, giving accuracy to ten digits in the root. The counter is cleared after the entry of the radicand factor.

C. The decimal point marker of the counter is then placed in the proper position. This is determined by setting off the radicand in groups of two, as is conventional in square root extraction, and the decimal point moved one place for each group (of two digits) in the radicand. The keyboard and counter are then cleared.

D. Then, in the order in which operation would have been initiated in longhand extraction of square root, or in the odd integer method described in my copending application, S. N. 210,079, "5" is placed in the keyboard and subtracted. The order in which operation is begun is determined by pointing off the radicand (i. e., the radicand set in the keyboard, not the radicand factor standing in the register) in groups of two, as is done in manual square root extraction, the "5" being placed under the right-hand figure of the leftmost group of numbers (under the leftmost digit of the radicand if the leftmost group had only one digit, or under the second from the leftmost digit if the leftmost group had two digits).

E. The first step of the extraction operation, as has been noted in "D" above, is the subtraction of the value of "5" in the initial order. In the second cycle the value of "15" is subtracted, and in each of the succeeding cycles the value in the keyboard is increased by "10" (i. e., in the 3rd cycle the value of "25" is subtracted, in the 4th the value of "35," etc.). In other words, the value in the lowest order of the keyboard factor is always "5," and in the next higher order the values increase arithmetically by "1," beginning with "0," in successive cycles of operation. When an overdraft is registered, the value last set in the keyboard, i. e., the value which caused the overdraft when subtracted from the value in the register, (e. g., "X5") is added back into the register, to correct the overdraft. The carriage is then shifted one step to the left.

F. The value in the lower order is then erased, leaving the selection mechanism of that order standing at "0," and "5" is placed in the next lower order. The keyboard value is not otherwise changed. The value then standing in the keyboard (which consists of the number in the tens-order of the first ordinal operation and "05," e. g., "X05") is subtracted. The "5" is permitted to stand in the lowest order (as well as the keyboard value obtained in the tens-order of the previous step, i. e., the hundreds order of the present step), and in the next higher order (in which the "0" was standing during the first cycle of the second ordinal operation) the value of "1" is inserted (e. g., "X15") and the machine again cycled subtractively. The value in the tens-order of the new keyboard factor is increased by "1" in consecutive cycles of operation until an overdraft is again reached.

G. Again, when the keyboard value causes an overdraft, the value then standing in the keyboard is added back to correct the overdraft and the carriage shifted one order to the left. Again the "5" in the lowest order is erased and a "5" placed in the order next lower thereto, without otherwise changing the keyboard value. This process is continued across the keyboard until the extraction has been completed.

An example of the extraction of square root is given below, using the radicand of 390937.5625 as illustrative of the process (the radicand so used is the same as that used to exemplify the odd integer method described in the application above-mentioned, so that the differences in the methods can be readily seen by a comparison with that application):

[Carriage in extreme right-hand position—counter set for unlike operation.]

| Step | Operation | Keyboard Value | Accumulator Dial Reading (Zeros to right of keyboard ignored) | Counter Dial Reading |
|---|---|---|---|---|
| 1 | Add | 390937.5625 | 390937.5625 | 900.0000000. |
| 2 | do | 390937.5625 | 781875.1250 | 8. |
| 3 | do | 390937.5625 | 1172812.6875 | 7 (zeros omitted for clarity). |
| 4 | do | 390937.5625 | 1563750.2500 | 6. |
| 5 | do | 390937.5625 | 1954687.8125 | 5. |
| 6 | Clear Keyboard |  |  | Clear Counter. |
| 7 | Subtract | *05 | 1904687.8125 | 100.0000000. |
| 8 | do | 15 | 1754687.8125 | 2. |
| 9 | do | 25 | 1504687.8125 | 3. |
| 10 | do | 35 | 1154687.8125 | 4. |
| 11 | do | 45 | 704687.8125 | 5. |
| 12 | do | 55 | 154687.8125 | 6. |
| 13 | do | 65 | Overdraft | 7. |
| 14 | Add | 65 | 154687.8125 | 6. |
| 15 | Shift | 60 | 154687.81250 |  |
| 16 | Subtract | 605 | 94187.81250 | 610.0000000. |
| 17 | do | 615 | 32687.81250 | 620. |
| 18 | do | 625 | Overdraft | 630. |
| 19 | Add | 625 | 32687.81250 | 620. |
| 20 | Shift | 620 | 32687.812500 |  |
| 21 | Subtract | 6205 | 26482.812500 | 621. |
| 22 | do | 6215 | 20267.812500 | 622. |
| 23 | do | 6225 | 14042.812500 | 623. |
| 24 | do | 6235 | 7807.812500 | 624. |
| 25 | do | 6245 | 1562.812500 | 625. |
| 26 | do | 6255 | Overdraft | 626.0000000. |
| 27 | Add | 6255 | 1562.812500 | 625. |
| 28 | Shift | 6250 | 1562.8125000 |  |
| 29 | Subtract | 62505 | 937.7625000 | 625.1. |
| 30 | do | 62515 | 312.6125000 | 625.2. |
| 31 | do | 62525 | Overdraft | 625.3. |
| 32 | Add | 62525 | 312.6125000 | 625.2. |
| 33 | Shift | 62520 | 312.61250000 |  |
| 34 | Subtract | 625205 | 250.09200000 | 625.21. |
| 35 | do | 625215 | 187.57050000 | 625.22. |
| 36 | do | 625225 | 125.04800000 | 625.23. |
| 37 | do | 625235 | 62.52450000 | 625.24. |
| 38 | do | 625245 | 00.00000000 | 625.25. |
| 39 | do | 625255 | Overdraft | 625.26. |
| 40 | Add | 625255 | 00.00000000 | 625.25. |
| 41 | Drop last "5" | 625250 | 00.00000000 | 625.25. |

*Note that the first "5" is subtracted in the order which held the right-hand digit of the leftmost group (of two) of the radicand.

It can be mentioned that as a practical matter, when the process has been carried through five orders of the answer, the division key may be depressed and a regular division operation initiated. In other words, when the normal ten-order keyboard is considered, the extraction of the square root through the first five places in the counter, counting from the left, is usually sufficient. If regular division is initiated after this point has been reached, the answer is correct through all the orders above the first and usually is correct in the lowest or right-hand order. When errors do occur, they will be limited to the digit in the right-hand counter, which error usually becomes insignificant in a nine or ten-order answer. However, the process can be carried entirely across the keyboard if desired.

The present invention relates particularly to a mechanism which is operative to control the entry of the "5" in each order as the extraction progresses, the entry of such value in any order operating automatically to erase the value of "5" in the next higher order without disturbing a value (including "5") set as the result of the arithmetical progression above-mentioned, and standing in the second higher order, or above.

A further object of the present invention is to provide a simple mechanism by means of which square root can be extracted manually in a more simple and speedy manner than heretofore, the operator being enabled to omit some of the mental steps heretofore required in the conventional extraction of square root in conventional calculating machines.

These and other objects of my invention will be apparent from the description and claims which follow. The mechanism of my invention will be more readily understood by reference to the drawings in which:

It will be understood that for purposes of disclosure, the invention will be shown and described as embodied in a machine of the type disclosed in the patent issued to Carl M. F. Friden on January 28, 1941, No. 2,229,889. It will be understood however, that the invention is not limited to incorporation in that particular machine as it can be incorporated or applied to other commercial calculating machines on the market. It will be understood, therefore, that the machine shown in the accompanying drawings and described herein is for purposes of exemplification only, and that the invention is not limited thereto.

It will also be understood that in its preferred form my invention would be associated with a mechanism shown in my copending application S. N. 210,079, which shows a mechanism valuable in the extraction of square root manually in conventional calculating machines. The mechanism of that invention shows an improved means, or mechanism, for sensing an overdraft, which mechanism is operable: To lock the keyboard against change, then initiate a single additive corrective cycle of the actuator and finally to shift the carriage a single step to the left. Coupled with that mechanism I would prefer to provide a manually controlled means for conditioning the machine for extraction of square root which would be operative to set the counter control to count in a sign character opposite that of the accumulator (to count positively in subtractive operations), and to set a mechanism limiting the actuator to a single cycle of operation without releasing the keyboard values. By such means the operator, after inserting the radicand factor in the accumulator, can direct his attention solely to the subtraction of the values in the order heretofore set forth, and when a selection causes an overdraft the machine would automatically lock the keyboard against further change, cause the initiation of the corrective additive cycle, and shift the carriage. Thereupon the operator can insert a "5" in the next lower order, which operation in accordance with the present invention will be operative to erase the value of "5" standing in the prior lowest order, and proceed with the operation. However, as the mechanism for locking the keyboard, initiating a single cycle of additive operation, and shifting the carriage is shown and described in my said copending application, it is believed that the present advance will be more thoroughly understood, if the mechanism of my said copending application is omitted herefrom. It will be understood in this regard that while in its preferred form the present invention would be associated with that shown in said copending application, the present invention can be applied to a conventional calculating machine with considerable advantage in the extraction of square root, and the present invention is so shown.

*General description*

Figures 6, 7:
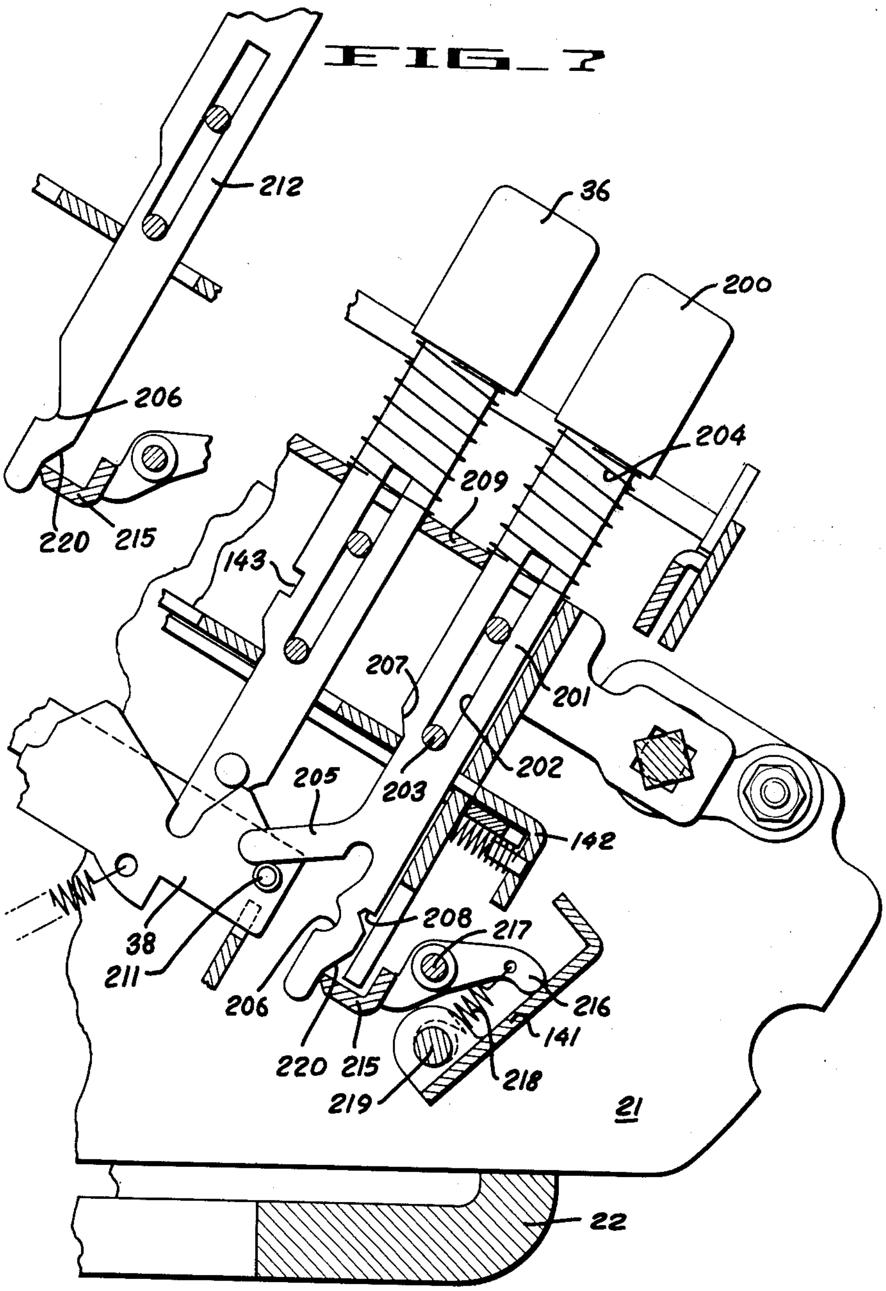
Fig. 6 is a cross-sectional view through the forward part of the machine showing one of the conventional value keys and one of the keys included in my invention, such as taken along the longitudinal vertical plane indicated by the line 6—6 of Fig. 1.
Fig. 7 is a sectional view of the zeroizing key for the new bank of keys included in my invention, such as taken along the longitudinal vertical plane indicated by the line 7—7 of Fig. 1.

The calculating machine incorporating the present invention includes a main frame comprising the main supporting plates 20 (Fig. 2) and 21 (Fig. 4) supported on a suitable base plate 22 (Fig. 6). The main operating mechanism of the machine is supported, for the most part, between the supporting plates 20 and 21. These frame plates 20 and 21 are interconnected and braced by suitable crossframe members, such as 24, 25 and 26 (shown in cross-section in Fig. 2).

An accumulator and revolutions counter carriage 30 (Fig. 2), is mounted for endwise shifting movement transversely of the frame. The carriage 30 has mounted therein a series of accumulator dials 35 and also a group of revolutions counter dials 80, both series of which are viewable through suitable windows provided in the cover 29 of the carriage. The carriage may be shifted by power in either direction across the machine by manipulation of conventional shift keys 31 and 32, or automatically shifted in certain operations, such as as to the left in division.

Figure 1:
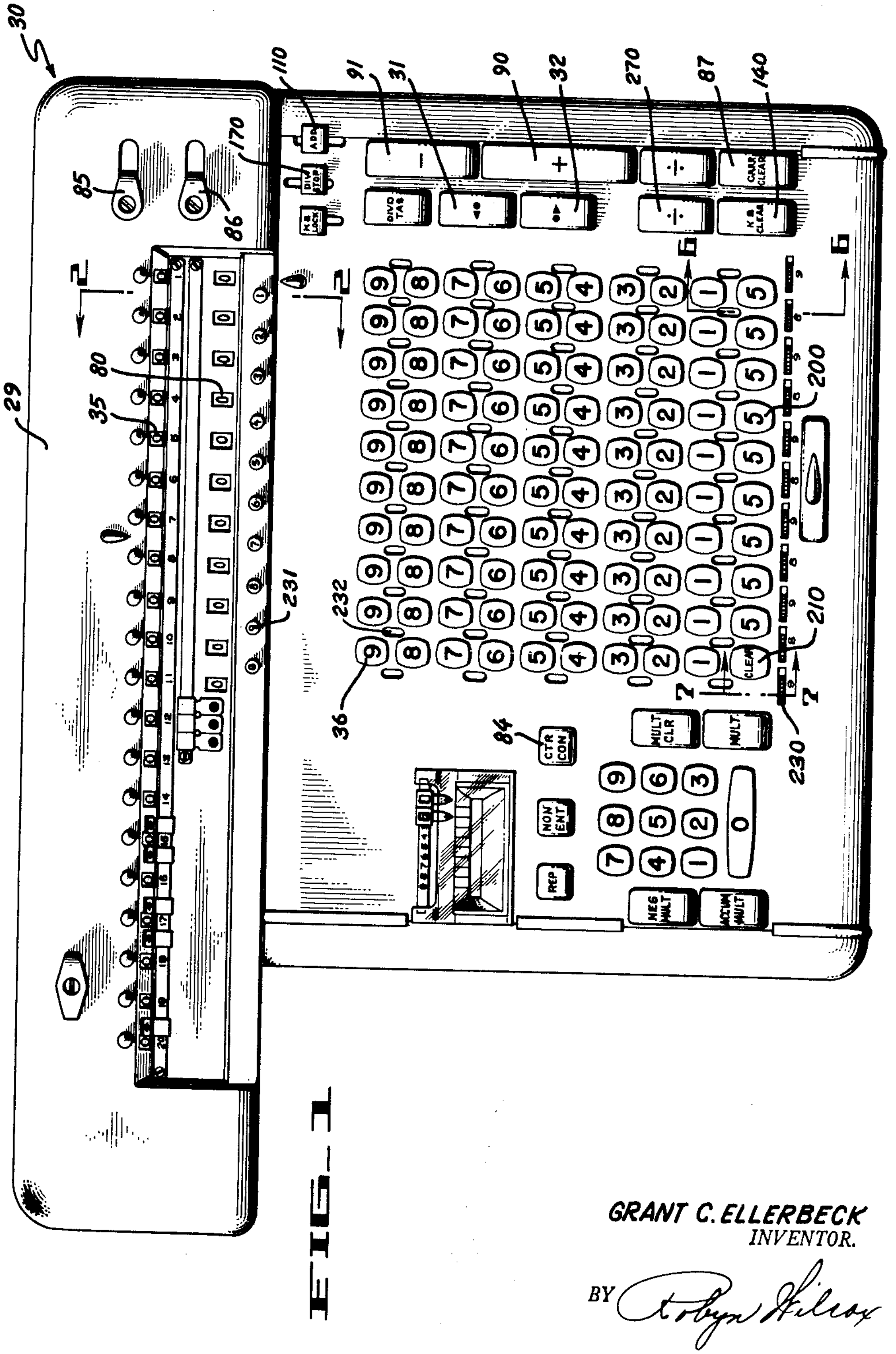
Fig. 1 is a plan view of a calculating machine of the type manufactured under the Friden Patent No. 2,229,890, with the control mechanism of my invention contained therein.

Numerical values may be entered in the machine by depression of appropriate numeral keys 36 of a conventional amount keyboard. The simultaneous release of all of the keys may be accomplished by a conventional mechanism operated by a clear key 140 operating the clearing bail 141 (Fig. 6). The various values set up on the keyboard may be registered additively or subtractively on the accumulator wheels 35 by the depression of a plus key 90 or a minus key 91, respectively (Fig. 1). If it is desired that the keyboard be cleared after each registration of a number in the accumulator, an add key 110 may be rocked forward and latched down in the well-known manner.

The accumulator dials 35 and the revolutions counter dials 80 may be cleared or reset to zero by manipulation of conventional mechanisms, such as clear knobs 85 and 86, respectively, or by depression of clear key 87. As these mechanisms operated thereby are conventional, they need not be described here.

The machine is adapted to perform automatic division operations by manipulation of a division key 270 (Figs. 1 and 3) which controls a division mechanism similar to the type described in U. S. Patent No. 2,327,981 to Carl M. F. Friden, issued August 31, 1943. It can be mentioned at this point that a division operation may be terminated at any time, at the will of the operator, by operation of a division stop key 170 (Figs. 1 and 4).

*Selecting and actuating mechanism*

Figure 2:
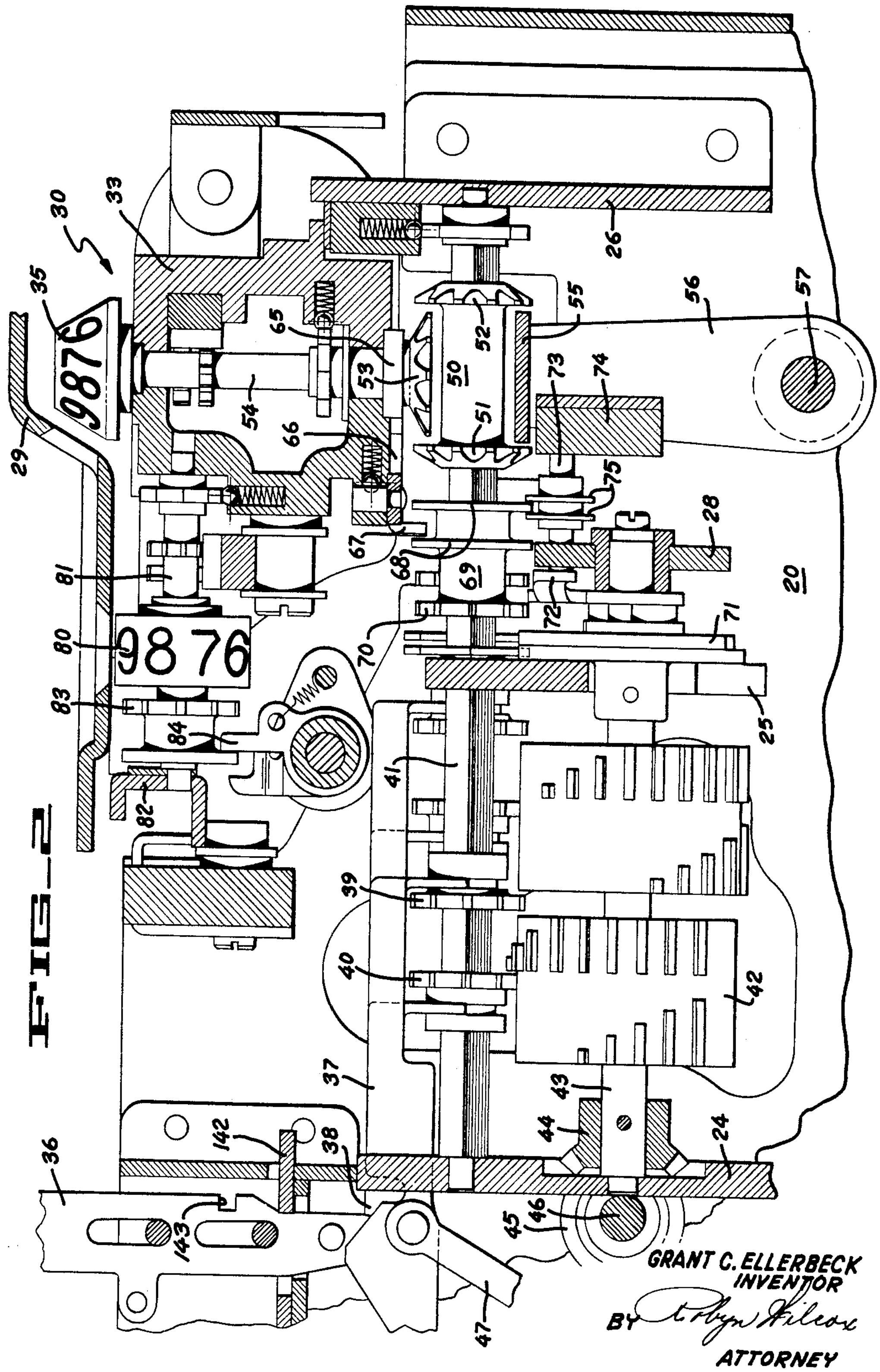
Fig. 2 is a cross-sectional view through the actuating portion of the machine shown in Fig. 1, such as taken along the longitudinal vertical plane indicated by the line 2—2 of Fig. 1.

The values to be entered into the accumulator dials, or wheels, 35 may be determined by means of a plurality of similar selecting mechanisms associated with the amount keys 36. As shown in Fig. 2, each order of amount keys cooperates with a pair of similar value selecting slides 37, 38, which are mounted for endwise movement by suitable means, such as levers 47. As is well-known in the Friden machine, the selecting slide 38 serves the "1" to "5" keys, and the selecting slide 37 serves the "6" to "9" keys. Whenever a key 36 is fully depressed it is latched in such position by an ordinal latching slide 142 of conventional construction, engaging a notch 143 in the keystem. Any depressed key can be unlatched by moving its ordinal slide 142 rearwardly.

Each "6" to "9" selecting slide 37 is provided at its rear end with an integral yoke which engages an annular slot in the hub of a ten tooth selection gear 39, the "1" to "5" selecting slide 38 is similarly connected to selection gear 40. Both gears are slidably and nonrotatably mounted on a longitudinally extending square shaft 41 journalled in the crossbars 24, 25 and 26. Hence, the longitudinal movement of the slides 37 and 38, as differentially controlled by the numeral keys 36, serves to position the selecting gears 39 or 40 in the path of a series of stepped teeth provided on an actuating cylinder, or mutilated drum, 42. The actuating drums 42 are secured to a shaft 43 journalled between the crossbar 24 and a transverse supporting bracket 28. For each adjacent pair of key orders there is provided one longitudinally extending actuator shaft 43 bearing a pair of actuating cylinders 42. Each actuator shaft 43 is provided at its forward end with a bevel gear 44 which meshes with a corresponding bevel gear 45 secured to a transverse drive shaft 46 journalled between the side frames 20, 21 of the machine.

The shaft 46 is cyclically and unidirectionally operated by means of a clutch controlled driving means, hereinafter briefly mentioned, so as to provide a single path of power flow from the electric driving motor to the various power operated mechanisms of the machine.

Each of the square shafts 41 is provided on its rear end with a slidably but nonrotatably mounted spool 50 which is provided with an integral ten-tooth add gear 51 and a ten-tooth subtract gear 52, which gears are adapted to cooperate with similar ten-tooth gears 53 secured on the lower ends of accumulator numeral wheel shafts 54.

When the machine is in its idle, or full cycle, position, the accumulator gears 53 lie midway between the add and subtract gears 51 and 52 so as to permit lateral shifting movement of the carriage. The gears 53, in this case, are free to pass through the space existing between the gears 51 and 52.

In order to enable an amount set up on the keys 36 to be added into the accumulator wheels 35, the spools 50 and integral gears 51 and 52 may be shifted toward the rear of the machine so as to engage the add gears 51 with the accumulator gears 53. This shifting of the gears is accomplished by means of a flat bar, or gate 55 extending transversely of the machine and lying within the space provided between the add-subtract gears 51, 52. The gate 55 is supported at either end by a pair of similar arms 56 secured to a transverse gate shaft 57 journalled between the side frames 20 and 21. The gate 55 may be rocked rearwardly (clockwise as viewed in Fig. 2) in a manner hereinafter to be described so as to cause engagement of the add gears 51 with the accumulator gears 53; or alternatively, the gate 55 may be rocked forwardly (counter-clockwise in Fig. 2) so as to result in engagement of the subtract gears 52 with the accumulator gears 53.

*Tens-transfer mechanism*

Secured to the lower end of each of the numeral wheel shafts 54 is a single tooth tens-transfer cam 65 which is adapted to cooperate with a transfer lever 66 suitably journalled in the main carriage frame bar 33. On the outer end of the transfer lever 66 there is provided a down-turned ear 67 which lies between a pair of flanges 68 provided on the hub 69 of a tens-transfer gear 70 located in the next higher order of the machine. The hub 69 and gear 70 are slidably, but non-rotatably, mounted on the square shaft 41, whereby rotation of the gear 70 will be transmitted through the add-subtract gears 51, 52 to the numeral wheel shaft 54. Whenever the accumulator wheel 35 passes from "0" to "9" or from "9" to "0," the single tooth on the transfer cam 65 will rock the transfer lever 66 and move the ear 67 forwardly so as to move the transfer gear 70 into the path of a single, transfer actuating tooth formed on a disc 71 secured to the drum shaft 43. The single tooth will thereby cause one step of movement to be given to the square shaft 41 in addition to the normal movement imparted thereto by the actuating cylinder 42. The accumulator wheel 35 will thus be advanced one step so as to effect the transfer between one order and the next higher order, as required.

After the tens-transfer has been effected, the transfer gear 70 will be restored to its normal position by means of a restoring cam 72 secured to the actuator shaft 43. This restoring cam operates on the forward end of a detent pin 73 which is mounted for sliding movement in the bracket 28 and in a second transverse supporting bracket 74. The pin 73 carries a pair of spaced flanges 75 which embrace one of the flanges 68 provided on the hub 69 of the transfer gear 70, so that when the pin 73 is cammed rearwardly, the gear 70 will be restored to its normal position.

*Revolutions counter*

As shown in Fig. 2, each of the revolution counter numeral wheels 80 is secured to a longitudinally extending shaft 81, journalled at its rear end in the carriage frame bar 33 and at its forward end in a carriage rail 82 which forms the front support and frame of the carriage 30. Secured to each of the shafts 81 is a gear 83 which is arranged to cooperate with a revolutions counter actuating mechanism 84 for operating the counter dials 80 in such a manner as to provide a count of the cyclic operations of the calculating machine, and also for causing a unit to be transferred from a lower order to a higher order each time a wheel 80 passes through zero.

The revolutions counter mechanism is fully shown and described in the above-mentioned Patent No. 2,229,889, to which reference may be had for a more complete disclosure of this part of the machine. Further, the counter mechanism may be set at the will of the operator for either like or unlike actuation with respect to the accumulator, by a suitable mechanism such as that shown in the Friden Patent No. 2,294,111. This control mechanism is not shown herein, but is set by manipulation of counter control key 84 (Fig. 1).

*Actuator drive and control*

In order to effect registration in the accumulator of the value set up on the amount keys 36, the actuator shafts 43 are operated in a cyclic fashion by means of a clutch controlled drive from an electric motor of the machine, not shown. As shown in Fig. 4, the armature shaft 160 of the motor has secured thereto a pinion 161 which meshes with an idler gear 162, which in turn meshes with a large gear 163 rotatably mounted on the transverse power shaft 46. The gear 163 forms the driving element of a clutch, indicated generally at 165, such as shown and described in Friden Patent No. 2,229,889. The clutch per se forms no part of the invention, so its construction will not be described. It should suffice to mention that engagement and disengagement of the clutch is controlled by a pawl, or dog, 164, rocked by link 106. The link 106 is pivotally mounted at its rear end on the clutch pawl 164, and its front end is pivotally mounted, as by pin 105, to the upper end of lever 107. The lever 107 is pivoted to the supporting frame 21 by any suitable means, such as screw 108. A switch control link 127, pivotally connected to the lower end of lever 107 controls the opening and closing of the motor switch (not shown) in a well-known manner. Also pinned to the lever 107, by pin 105, is a clutch control link 104 which operates the clutch and motor switch, and is also used to limit operation to a single cycle when necessary.

An example of actuator control will be given in connection with the operation of the plus-minus keys to control additive and subtractive cycles of operation. This mechanism is shown particularly in Fig. 3. It will be observed that the plus key 90 and the minus key 91 are both slidably mounted on an auxiliary, or control, plate 23. The keys 90 and 91 are provided with roller studs 92 and 93; respectively, which cooperate with the oppositely inclined cam faces 94 and 95, respectively, provided on a gate setting link 96. This link is pivotally connected at either end to the upper ends of arms 97 and 98, the forward arm 97 being pivoted on the control plate 23 while the arm 98 is secured to the right-hand end of the gate shaft 57. Hence, when the plus key 90 is depressed, the slide 96 will be moved rearwardly so as to rotate the gate shaft in a counter-clockwise direction, as viewed in Fig. 3 (clockwise in Fig. 2), thereby causing the add gears 51 to be engaged with the accumulator gears 53 on the numeral wheel shafts 54. In a similar manner, depression of the minus key 91 will cause forward movement of the slide 96, thereby rocking the gate shaft 57 (clockwise in Fig. 3, or counter-clockwise in Fig. 2) so as to engage the subtract gears 52 with the accumulator gears 53.

In order to initiate operation of the drive mechanism of the machine when either key 90 or 91 is depressed, each of these keys is provided with a half-round stud 100 which is adapted to cooperate with a cam face 101 provided on a cycle-initiating slide 102 which is supported for longitudinal movement by suitable pin and slot connections 99, as shown. The forward end of this slide carries a stud 103, which extends through an appropriate slot in the supporting plate 24, where it is embraced by a slot 109 in the control link 104 to engage the clutch and close the switch controlling the flow of power to the motor. This will cause the electric driving motor of the machine to be energized and the power shaft 46 to be rotated, thereby driving the actuator shafts 43 to which are secured the actuating drums 42. Hence, the amount set on the keys 36 will be run into the accumulator wheels 35 in either a positive or negative direction depending on which of the keys 90 or 91 is depressed.

*Single cycle and keyboard clear*

It is conventional in calculating machines of this kind to provide an "add" key which is operative, when set to operative position, to limit the machine operation to a single cycle even though a control key is held depressed, and to automatically release the keyboard setting toward the end of the single cycle of operation. It is necessary in my machine to disable such keyboard clearing mechanism, as will be evident by a reference to the outline of steps above given, for it is necessary to retain a keyboard value at all times. However, it is highly desirable, although not absolutely essential, to limit operation to a single cycle. The conventional single cycle, or "add" key mechanism will now be described, as well as means for modifying such control to disable the keyboard clearing mechanism.

Figure 3:
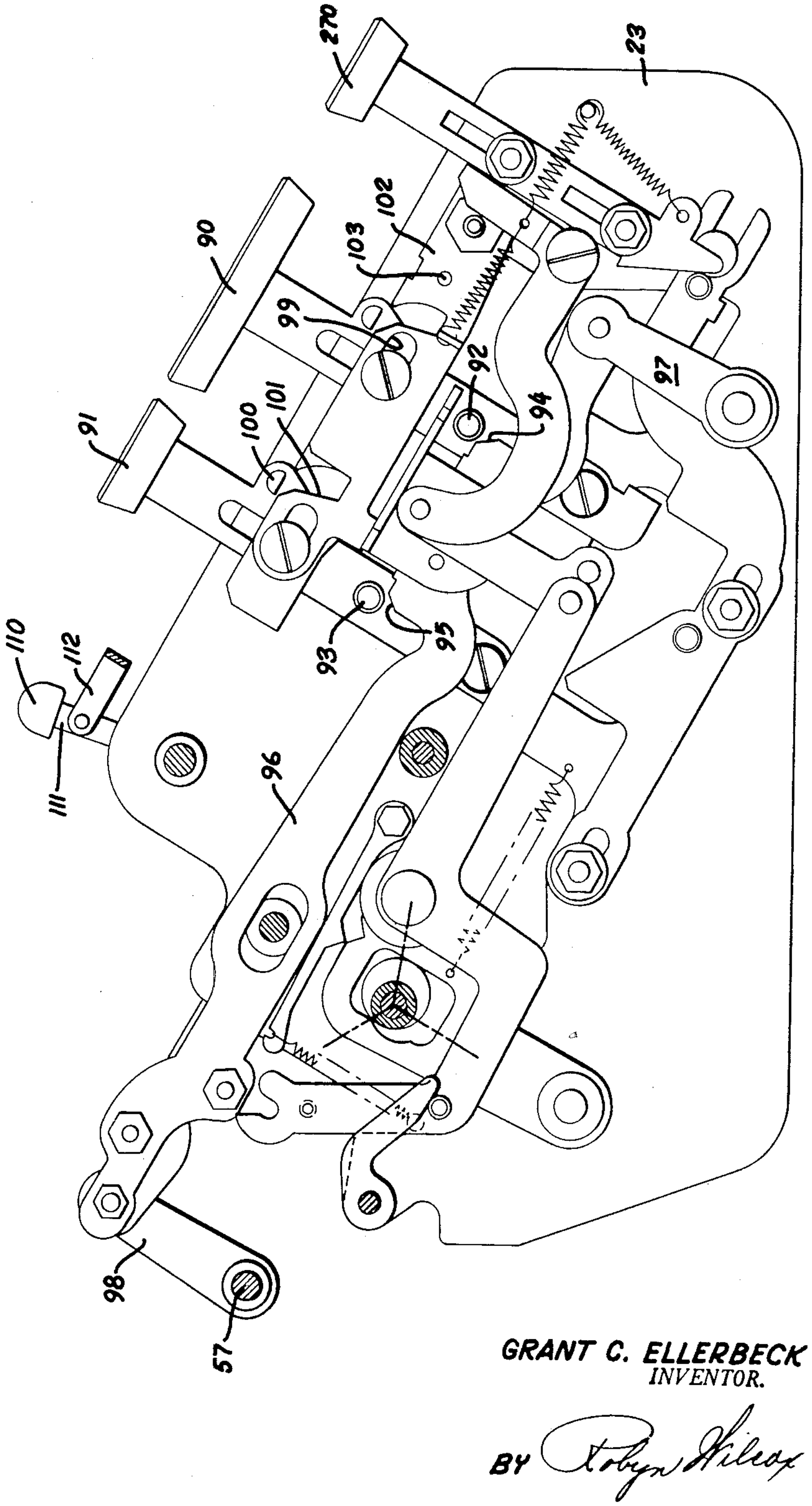
Fig. 3 is a left side view of the auxiliary, or control, plate, showing particularly the digitation control mechanism.
Figure 4:
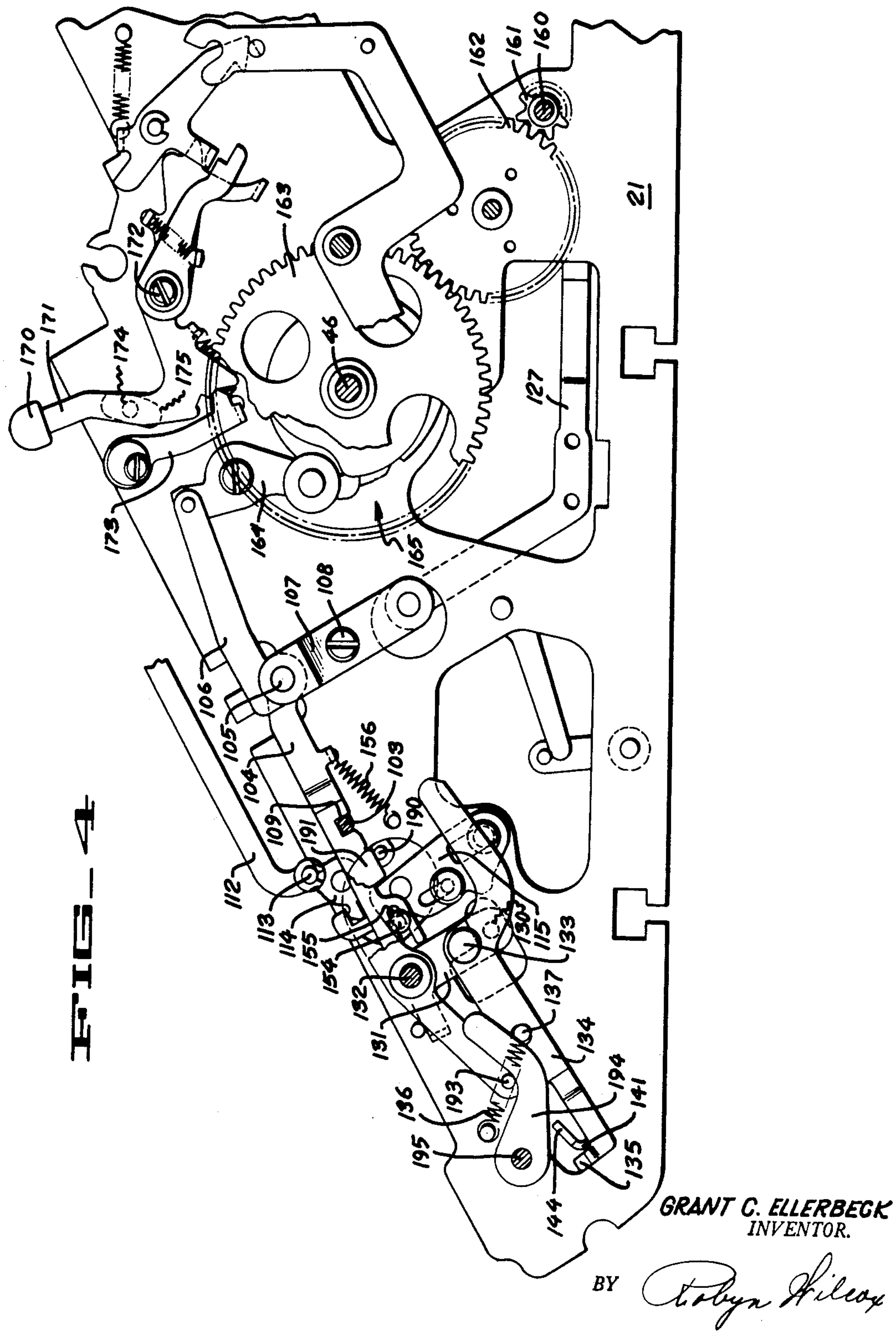
Fig. 4 is a right side view of the right frame plate, showing particularly the mechanism for limiting operation of the machine to single cycle, without clearing the keyboard.
Figure 5:
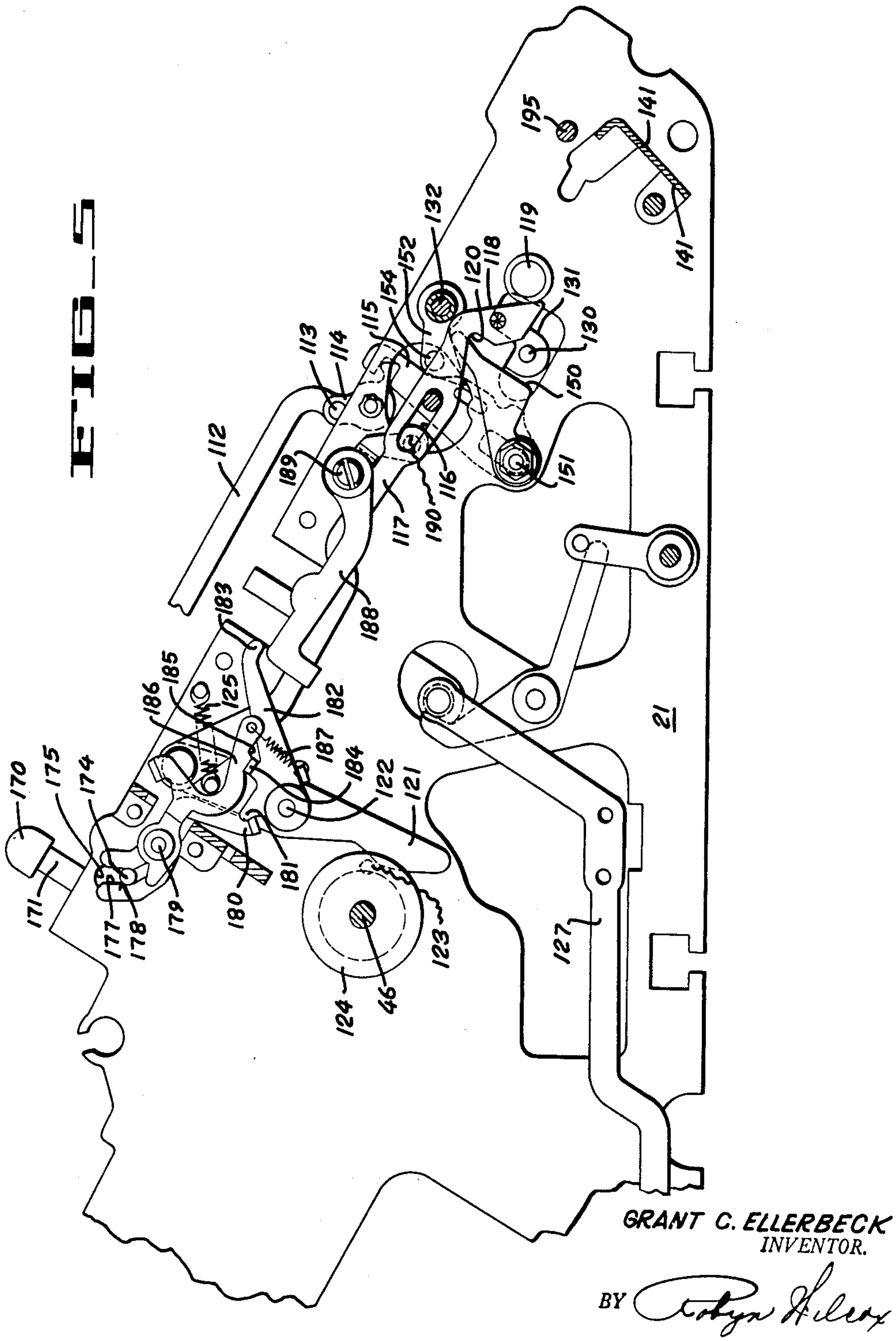
Fig. 5 is a left-hand view of the mechanism shown in Fig. 4, showing other parts of the single cycle, keyboard non-clearing mechanism.

The normal operation of the automatic single cycle and keyboard clear mechanisms are under the control of the "add" key 110 (Figs. 1 and 3). In the preferred form of machine, the "add" key 110 is mounted on the upper end of lever 111 pivotally mounted on the auxiliary plate 23. The upper end of lever 111 is connected by a link 112 (see Figs. 4 and 5) to a long pin 113 mounted on a bellcrank 114, which bellcrank is mounted on main plate 21. Referring particularly to Fig. 5, when the key 110 is rocked forwardly it rocks bellcrank 114 clockwise, depressing slide 115. Depression of slide 115, by means of a pin and slot connection 116 with a long link 117, lowers the front end of the link 117. The link is urged forwardly by spring 125, but is normally cammed rearwardly by engagement of a cam face 118 thereon with a roller 119 on the frame. However, as the link is lowered it moves forwardly into operative position. The downward and forward movement results in engaging a notch 120 in the link 117 with a pin 130, the purpose of which will be presently described. When the link 117 moves forwardly it rocks the foot of a lever 121, pivoted at 122 on plate 21 into the path of a pin 123 secured to wobbler cam 124 on the main drive shaft 46. As the drive shaft 46 rotates (counter-clockwise in Fig. 5) the pin 123 rocks the lever 121 near the end of the cycle and this causes the link 117 to draw the pin 130 rearwardly.

The pin 130 (as shown in Fig. 4) is secured to a bellcrank 131, pivoted at 132 to the side frame 21. Pivotally mounted at 133 on the bellcrank 131 is a forwardly extending arm 134. A lip 135 on the front end of the arm 134 is adapted to engage an extension 144 on the clearing bail 141. Normally, reciprocation of link 134 will rock bail 141, as the link is raised by a spring 136, tensioned between a suitable stud on the frame plate and another stud 137 on the arm, to engage the ear 144. However, the forward end of arm 141 can be rocked downwardly (counter-clockwise in Fig. 4) against cooperation with the ear 140, thereby disabling keyboard clearing. It will be understood that rocking of the bail operates ordinal latch slides 142 (Fig. 6) to release the keys of the keyboard in a conventional manner.

The rocking of the bellcrank 131 is effective also to disengage the clutch and to open the motor switch, thereby stopping the machine after a single cycle of operation, even though the plus or minus key is held depressed for a longer period. An arm 150 (Fig. 5) is pivotally mounted on the left side of the supporting plate 21 by any suitable means, such as on stud 151, which also guides the slide 115. The arm 150 is extended to lie adjacent a second arm 152 which is pivotally mounted on the plate 21 by any suitable means, such as pin 132. The second arm 152 carries a pin 154 which engages a slot 155 in the forward end of the link 104 (see Fig. 4). Thus, as the long link 117 is rocked sharply (to the left in Fig. 5) toward the end of a cycle of operation, the pin 130 and bellcrank 131 are also rocked rearwardly. The pin 130 engages the arm 150 in such rocking, thereby rocking it counterclockwise. The upper end of arm 150 engages the second arm 152, thereby rocking it clockwise about its pivot point 132. Rocking of the arm 152 and its pin 154 lifts the forward end of the link 104 so that the slot 109 in link 104 becomes disengaged from the pin 103 on the plus-minus slide 102. The link 104, being disengaged from the pin 103, can then spring forwardly under the tension of its spring 156. The forward motion of link 104 rocks the arm 107 to open the motor switch and pulls the link 106 and clutch pawl 164 to open the clutch. Thus, when the "add" key is rocked forwardly, the machine is operated automatically to stop operation after a single cycle even though the control keys are held depressed, and also normally is operated to clear the keyboard by floating arm 134 rocking the clearing bail 141.

In the machine shown in the drawings herein, means are provided for conditioning the machine for single cycle operation without clearing of the keyboard at the end of the cycle. Such a condition of the machine results when the "add" key 110 is pulled to its forward position and there latched by the conventional detent therefor. The division stop key 170 is also pulled to its forward, or operative, position, in which position the clearing arm 134 is disabled as will now be explained. The division stop 170 is customarily mounted on a lever 171, pivoted to the side frame 21 by any suitable means, such as screw 172. The operation of this key to stop a division operation is not pertinent to this invention and will therefore not be described. It can be noted, however, that the stop key is latched in either its intermediate position shown in Fig. 4, or in its forward position by a suitable detent 173.

The lever 171 carries a pin 174 (see particularly Fig. 5) which extends through a suitable aperture 175 in the frame plate 21. This pin 174 is embraced (see Fig. 5) within the slot 177 formed in the rear arm of a lever 178. The lever is pivotally mounted on the frame plate by any suitable means such as pin 179, and has a forwardly extending arm terminating in an ear 180. It will be obvious that when the stop key 170 is rocked, the pin 174, regardless of the direction of rocking of the stop key 170, will rock the rear end of the lever 178 downwardly (counter-clockwise in Fig. 5). When so rocked the ear 180 engages the rear arm 181 of a bellcrank 182, pivoted on the pin 122. The bell crank 182 is provided with an ear 184 which, when the bellcrank is rocked forwardly (clockwise in Fig. 5), is engaged by the shoulder 185 of a latch 186. The latch is pivotally mounted on the pin 179, and is urged into engagement with the bell crank 182 by a suitable tension spring 187.

The forward end 183 of the bellcrank 182 overlies a two-armed lever 188 pivotally mounted on the frame plate 21 by any suitable means, such as screw 189. When the bell crank is rocked (clockwise in Fig. 5), by rocking of the division stop key 170, the two-armed lever 188 is rocked counter-clockwise. The forward arm of the two-armed lever is provided with a pin 190 which projects through a suitable aperture in the frame plate (as shown in Fig. 4) and underlies the rear arm of a two-armed lever 191. This latter lever is also pivotally mounted on the pin 132, as shown. The forward arm of this lever carries a pin 193 which engages the upper edge of an arcuate arm 194, rotatably mounted on a cross-shaft 195. The lower edge of this arcuate lever engages the stud 136 mounted on the floating clear link 134, so that rocking of the two-armed lever 191 (counter-clockwise in Fig. 4) rocks the arm 194 downwardly to depress the floating link to a position in which its forward ear 135 is unable to engage the ear 144 on the clear bail 141. Thus, when the division stop key 170 is in its forward position, the automatic keyboard clear mechanism is disabled even though the "add" key is set in its forward, or single cycle, position.

*Square root mechanism*

As indicated previously, my invention relates primarily to a mechanism which is operative to readily insert a value of "5" in the lowest order of the keyboard factor and to erase the value of "5" in the next higher order. The preferable form of my invention comprises a bank of keys across the front of the keyboard, each being adapted to set the ordinally related selection slide 38 to a value of "5." Each such key is latched in its depressed position by a transverse latching mechanism which will not interfere with the selection of values in other parts of the conventional keyboard; which latching mechanism is operated by depression of any other of the bank of "5" keys, and is released from the latching bail for such keys by operation of the regular clear bail 141.

As shown in Fig. 1, the preferred form of my embodiment comprises a bank of "5" keys 200 across the front of the keyboard, each of which, except the leftmost or highest order key, is operative to insert a value of "5" in the selection mechanism of its order. The leftmost key 210 of this bank is a clear key, operative to release any key of that bank which may be latched in a depressed position. The "5" keys 200 and the clear key 210 are shown in greater detail in Figs. 6 and 7, to which reference is now made. The "5" value keys 200, as shown in Fig. 6, are mounted on key stems 201. The key stems preferably are provided with a long slot 202 which embraces a pair of crossrods 203, thereby supporting the key and key stem for vertical movement. The keys are normally resiliently biased to the raised position by a suitable compression spring 204 surrounding the key stem and compressed between the key top 200 and a cross plate 209 of a conventional keyboard frame.

I prefer that the square root keys, i. e., the special "5" bank, be aligned with the ordinally associated row of value keys, as shown in Fig. 1. If preferred, these keys could be placed in alignment with the decimal point markers located between adjacent orders, or elsewhere without departing from the concept of my invention. However, when the square root keys are placed as shown, it will be less confusing to the operator as the key 200 in one order will be depressed and the values in the next higher order changed arithmetically as indicated.

The key stems 201 are preferably provided with a rearwardly extending cam arm 205 which engages a small roller 211 on the forward end of the "1" to "5" selection slide 38. Thus, depression of a square root value key 200, through the arm 205, cams the selection plate 38 forwardly to a position in which it registers a value of "5" on the selection mechanism previously described.

The key stem 201 is provided with a cam 207 adapted to translate the ordinal key latch 142 rearwardly to unlatching position when the key 200 of that order is depressed. The key does not contain the conventional latching notch 143 as it is desired to hold the ordinal latch 142 in its rearward position whenever the key 200 of that order is depressed. It is obvious that when the square root selection key, which enters a value of "5" in a preselected order, is depressed, it is necessary that the conventional value keys of that order be rendered inoperative.

The key stem 201 is also provided with a recess 206 so arranged that when the square root value key 200 is in its raised position, and a value of "5" is inserted into the selection slide 38 in the normal manner, the roller 211 can move to its forward position without interference from the key stem 201.

Latching means is provided for latching a depressed key 200 in its depressed position. Many forms of latching means could be proposed but I prefer to use a single latch bail 215 extending transversely across the keyboard in front of the square root value keys 200. This bail 215, as is shown in Fig. 6, is mounted on a pair of two-armed levers 216 pivotally mounted on a transverse shaft 217. A forwardly extending arm of the lever is engaged by the clearing bail 141, when the latter is rocked to clear the machine (counter-clockwise in Fig. 6), rocking the levers 216 counter-clockwise also. A suitable spring 218, preferably tensioned between the forward arm of the lever 216 and the shaft 219 on which the clearing bail is mounted, resiliently urges the bail 215 into engagement with a cooperating latching notch 208 in the forward edge of the key stems 201.

It is obvious that whenever a key 200 is depressed it operates through the cam arm 205 to cam the slide 38 forwardly to its forward position to enter a value of "5" into the register, and is latched in its depressed position by the latching bail 215. It is also obvious that whenever any other key of that bank is depressed, the bail 215 is rocked (counter-clockwise in Fig. 6) by the cam 220 provided on the front edge of each of the key stems 201, to release previously depressed keys and insert a value in the order of the last key depressed.

The clear key 210 and its associated stem 212 is similar to the keys 200 and their stems 201 in some respects, but it does not have the camming arm 205 nor the latching notch 208, as is clearly shown in Fig. 7.

*Operation*

When it is desired to extract a square root with the mechanism of my invention, the machine will have been conditioned for such extraction by shifting the carriage to the extreme right-hand position, and the "add" key 110 and the division stop key 170 rocked to their forward positions. As indicated above, the rocking of these latter two keys to their forward positions conditions the machine for single cycle operation while simultaneously disabling the automatic keyboard clear mechanism conventionally associated with the "add" key mechanism.

The radicand is then set into the keyboard, preferably with the rightmost digit of the leftmost group of two in the 9th order of the keyboard. In this position, operation will always begin with a subtraction of "5" in the 9th order. The radicand factor is then set into the register by entering the radicand additively five times. After the entry of the radicand factor into the accumulator, the counter is cleared and the operator is ready to begin the extraction operation.

Then beginning in the order in which the right-hand factor of the leftmost group of two of the radicand is entered, the square root value key 200 is depressed. This inserts a value of "5" in that order. It can be here noted that in the method used in my invention the "5" is not inserted in the highest order of the machine, as is normally necessary to provide for the entry of consecutive values in the next highest order. For this reason the leftmost key of the square root value key bank can be a clear key. After the entry of the "5" into the selection mechanism, through depression of the appropriate square root value key 200, the machine is cycled once subtractively, as by depression of the subtraction key 91. When the machine is properly conditioned, such depression will operate the machine only once even though the key is held depressed. A value of "1" is then inserted in the next higher order and the subtraction key 91 again depressed, thereby subtracting the value "15" from the radicand factor. In successive cycles the values standing in the higher order are progressively increased by "1" so as to subtract successively 25, 35, 45, etc. These subtractions are continued until the machine registers an overdraft, which conventionally is indicated by the ringing of a bell.

Upon registering an overdraft the operator terminates the subtractions above outlined. The operator then adds the last value back into the accumulator to correct the overdraft, and shifts the carriage one step to the left as by depression of the left shift key 31. As seen as the carriage is in its new ordinal position, the square root value key 200 in the order below that previously used, is depressed. The depression of the key 200 in the lower order operates to release the key 200 in the next higher order (thereby erasing the value of "5" in the next higher order) and inserts a value of "5" in the new order. The extraction operation can then proceed as outlined in the first part of this specification.

It will be obvious that in its preferred form a machine embodying my instant invention would also utilize the mechanism shown in my copending application S. N. 210,079 which is operative upon an overdraft, to latch the keyboard against alteration in any manner, to initiate the corrective additive cycle of operation, and finally initiate a single left shift of the carriage. With such a mechanism it would be impossible for the operator to misoperate the machine. However, such mechanism has not been shown in the instant invention as it is clearly shown, described, and claimed in said copending application.

By means of the invention here described, an operator is enabled to extract square root from any radicand more quickly, and with less chance of error, than is possible in conventional machines. The bank of square root value keys 200 enables an operator to quickly insert the value of "5" in the proper order and to erase the value of "5" in the next higher order. It would be possible of course, to use the regular selection keys 36 for the value of "5" for entering the values of "5," as the operation progresses. However, in that case it would be necessary to provide a clearing mechanism which is operated by the depression of a "5" key to erase the value of "5" in the next higher order only, as it is conceivable that there might be a value of "5" in the second higher order or higher orders, which as they were representative of a value of "55" should not be erased. Therefore, I prefer to use an entirely new bank of ("5") keys to utilize in the extraction of square root and to make the entire bank clearable either by depression of the clear key 210 or by depression of any other of the square root value keys 200.

A modified method for the extraction of square root is to place the radicand factor in the extreme left-hand orders of the keyboard, indicating the decimal point by operation of the decimal marker. Then, before inserting the radicand factor into the accumulator register, the carriage is shifted by operation of the right shift key 32, or is automatically tabulated, to the extreme or next to extreme position. If there are an even number of whole digits in the radicand (if the leftmost group has two digits), the carriage is shifted to the extreme position; if the radicand has an uneven number of whole digits (one digit in the leftmost group), then the carriage is shifted to the next to the last position. After the shifting is completed, the radicand is entered into the accumulator five times. If the carriage was shifted to the next to the last position; then, after the entry of the radicand factor, the carriage is shifted once to the right to place it in the extreme position. Operation then always begins in the 9th order of the keyboard. The determination of whether the carriage should be shifted to the extreme or next to the extreme right-hand position can be readily determined by placing suitable indicia under the knobs 230, which adjust the position of the decimal markers 232 as shown in Fig. 1. Such indicia can be of several forms. I prefer to use the figures "9" or "8" shown in Fig. 1. In the Friden calculating machine in which my invention is illustrated, the depression of the "9" tabulator key 231 shifts the carriage to the 9th decimal, or extreme right-hand, position, while the "8" tabulator key shifts to the 8th decimal, or the next to the extreme, position. Thus by using the indicia "9" or "8" as shown, the operator is enabled to tell in a glance, by placing the decimal mark in the radicand, whether the carriage should be tabulated to the 8th or 9th positions, and the extraction begun accordingly.

I claim:

1. In a calculating machine having ordinally arranged value keys representative of the values "1" to "9," inclusive, and an ordinal latch for each order of said keys, means operated by the keys of each order for releasing the latch of the respective order, an ordinally arranged selection mechanism operated by said keyboard, the improvement which comprises an additional bank of separably operable value keys, means operated by each of said additional keys for inserting a value of "5" in the related order of the selection mechanism, a common latch for said bank of keys, means operated by the keys of said bank for releasing the common latch, and a common means for releasing the common latch and each of said ordinal latches.

2. In a calculating machine having an ordinally arranged selection mechanism, an ordinally arranged keyboard having value keys representative of the values "1" to "9" inclusive for operating said selection mechanism, and an ordinal latch for each order of said keys, the improvement which comprises an additional bank of value keys, means operated by each of said additional keys for inserting a value of "5" into the related order of said selection mechanism, means operated by each of said additional keys for disabling the ordinal latch for the related order of said keyboard, a common latch for said bank of additional keys, and means operated by each of said additional keys for releasing said common latch.

3. The apparatus of claim 2 including also means for simultaneously releasing said common latch and said ordinal latches.

4. In a calculating machine having an accumulator, an ordinally arranged selection mechanism for controlling the entry of values into the accumulator, a keyboard arranged in ordinal rows of keys of values "1" to "9," inclusive, and in banks of ordinally arranged keys of like digital values, for the insertion of digital values into the various orders of the selection mechanism, the improvement which comprises an additional bank of ordinally arranged keys, means operated by the keys of said additional bank for inserting a common predetermined value in the related orders of the selection mechanism, a common latch for said bank of keys, and means for unlatching said common latch.

5. In a calculating machine having an ordinally arranged selection mechanism for controlling the entry of values into the machine, an ordinally arranged keyboard, an ordinal latch for each order of said keyboard, and means operated by the keys of each order of the keyboard for releasing the latch of their respective order, the improvement which comprises a transverse bank of ordinally arranged keys, means operated by said keys for inserting a value of "5" in the related order of the selection mechanism, a common latch for said bank of keys, and means operated by keys of said bank for unlatching said common latch.

6. In a calculating machine having an ordinally arranged selection mechanism for controlling the entry of values into the machine, a keyboard having keys arranged in orders of keys for the values "1" to "9" inclusive in each order and in transverse banks of like digital value, the keys of each order being operative to set the ordinally related selection mechanism, and an ordinal latch for each order of said keys, the improvement which comprises an additional bank of keys operative to insert a value of "5" into the related order of the selection mechanism, a common latch for said bank of keys, means operated by each key of said additional bank for unlatching said common latch and for disabling the ordinally related ordinal latch.

References Cited in the file of this patent

UNITED STATES PATENTS

| | | |
|---|---|---|
| 1,916,611 | Friden | July 4, 1933 |
| 1,969,262 | Friden | Aug. 7, 1934 |
| 2,294,948 | Avery | Sept. 8, 1942 |
| 2,325,388 | Friden | July 27, 1943 |
| 2,628,031 | Ellerbeck | Feb. 10, 1953 |